(12) United States Patent
Oliveira et al.

(10) Patent No.: US 11,343,092 B2
(45) Date of Patent: May 24, 2022

(54) BIOMETRIC AUTHENTICATION METHOD (71) Applicant: ADP, Inc., Roseland, NJ (US)

(72) Inventors: Israel Oliveira, Porto Alegre (BR);
Cristian Basilio, Porto Alegre (BR);
Douglas Parnoff, Porto Alegre (BR);
Leandro Pereira, Porto Alegre (BR)

(73) Assignee: ADP, Inc., Roseland, NJ (US)

( * ) Notice: Subject to any disclaimer, the term of this patent is extended or adjusted under 35 U.S.C. 154(b) by 0 days.

(21) Appl. No.: 16/905,024

(22) Filed: Jun. 18, 2020

(65) Prior Publication Data
US 2021/0399887 A1    Dec. 23, 2021

(51) Int. Cl.
*H04L 9/08* (2006.01)
*H04L 9/32* (2006.01)

(52) U.S. Cl.
CPC .......... *H04L 9/0866* (2013.01); *H04L 9/0894* (2013.01); *H04L 9/3236* (2013.01); *H04L 9/3247* (2013.01)

(58) Field of Classification Search
None
See application file for complete search history.

(56) References Cited

U.S. PATENT DOCUMENTS

| 6,925,182 B1* | 8/2005 | Epstein | H04L 9/0866 380/277 |
| 9,843,576 B1* | 12/2017 | Peng | H04L 67/02 |
| 2008/0022111 A1* | 1/2008 | Dietl | G06F 21/64 713/176 |
| 2013/0290136 A1* | 10/2013 | Sheets | G06Q 30/0609 705/26.35 |

* cited by examiner

*Primary Examiner* — Jeffrey C Pwu
*Assistant Examiner* — Mayasa A. Shaawat
(74) *Attorney, Agent, or Firm* — Yee & Associates, P.C.

(57) ABSTRACT

A method of biometric signature. The method comprises receiving a biometric data input from a user and generating a digital artifact from the biometric data input. N private keys are generated from the digital artifact. Upon receiving input of a document, a hash of the document is generated. In response to receiving a signature from the user on the document, the hash is encrypted with each private key to create an encrypted hash with N encrypted keys. The encrypted hash and N encrypted keys are stored in a database.

18 Claims, 7 Drawing Sheets

BIOMETRIC AUTHENTICATION METHOD

BACKGROUND INFORMATION

1. Field

The present disclosure relates generally to an improved computing system, and more specifically to an improved electronic signature system that enables biometric identification and validation of signers.

2. Background

Many documents require a user signature legally affirming the validity and veracity of information entered in the document. Examples of such forms include tax forms, banking forms, financial transactions, employment applications or benefits forms, etc. Such documents might be paper or electronic in form. Both physical and electronic signatures might be stored centralized repository.

SUMMARY

An illustrative embodiment provides a computer-implemented method for biometric signature. The method comprises receiving a biometric data input from a user and generating a digital artifact from the biometric data input. N private keys are generated from the digital artifact. Upon receiving input of a document a hash of the document is generated. In response to receiving a signature from the user on the document, the hash is encrypted with each private key to create an encrypted hash with N encrypted keys. The encrypted hash and N encrypted keys are stored in a database.

Another illustrative embodiment provides a system for biometric signature. The system comprises a storage device configured to store program instructions and one or more processors operably connected to the storage device and configured to execute the program instructions to cause the system to: receive a biometric data input from a user; generate a digital artifact from the biometric data input; generate N private keys from the digital artifact; receive input of a document; generate a hash of the document; receive a signature from the user on the document; in response to receiving the signature, encrypt the hash with each private key to create an encrypted hash with N encrypted keys; and store the encrypted hash and N encrypted keys in a database.

Another illustrative embodiment provides a computer program product for biometric signature. The computer program product comprises a computer readable storage media having program instructions stored thereon to perform the steps of: receiving a biometric data input from a user; generating a digital artifact from the biometric data input; generating N private keys from the digital artifact; receiving input of a document; generating a hash of the document; receiving a signature from the user on the document; in response to receiving the signature, encrypting the hash with each private key to create an encrypted hash with N encrypted keys; and storing the encrypted hash and N encrypted keys in a database.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that Many documents require a user signature legally affirming the validity and veracity of information entered in the document. Such documents might be paper or electronic in form. Both physical and electronic signatures might be stored centralized repository.

The illustrative embodiments also recognize and take into account that a signature by itself does not guarantee its own authenticity. An electronic signature might be fraudulent.

The illustrative embodiments also recognize and take into account that saving paper artifacts might not be sustainable. Physically stored paper artifacts with authentic signatures are subject to degradation and maintenance costs.

The illustrative embodiments provide a method for capturing identifying biometric data from a user and matching it to the user's signature on a document. The biometric data can be stored. Subsequent signatures by the same user can be authenticated by collecting biometric data from the user again and validating it against the previously stored biometric data.

Figure 1:
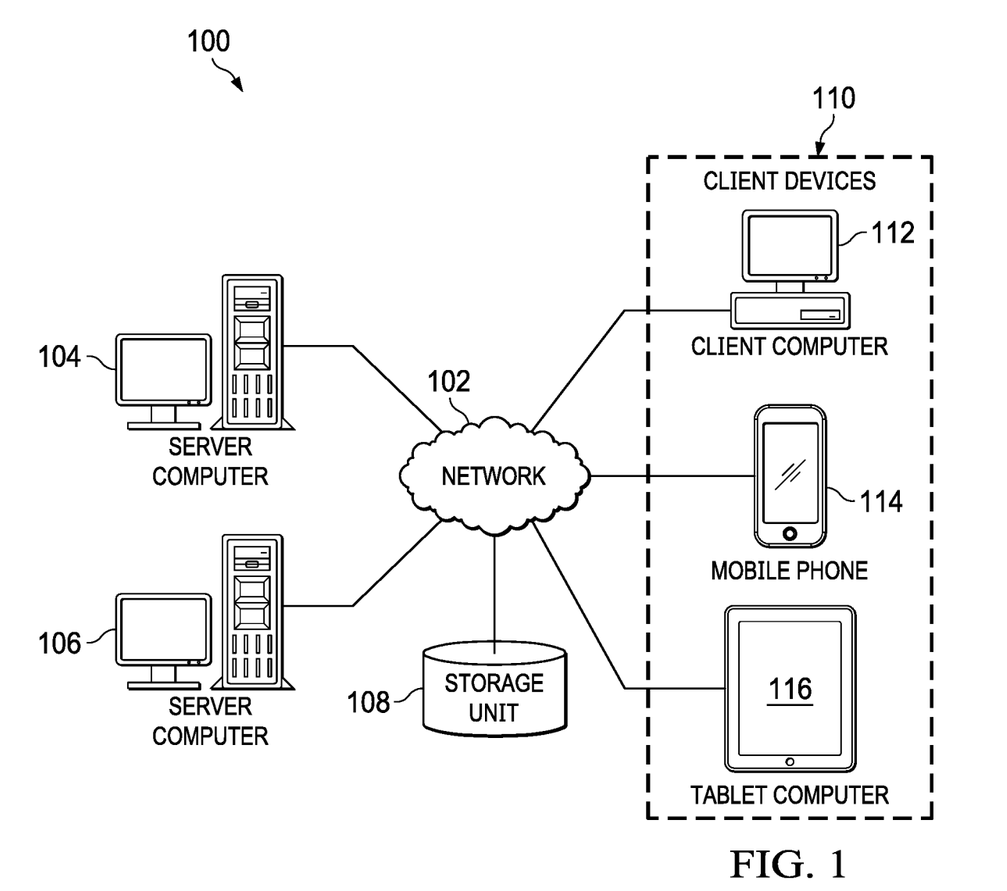
FIG. 1 is a pictorial representation of a network of data processing systems in which illustrative embodiments may be implemented.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

The computer-readable program instructions may also be loaded onto a computer, a programmable data processing apparatus, or other device to cause a series of operational steps to be performed on the computer, a programmable apparatus, or other device to produce a computer implemented process, such that the instructions which execute on the computer, the programmable apparatus, or the other device implement the functions and/or acts specified in the flowchart and/or block diagram block or blocks.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or mobile devices. As depicted, client devices 110 include client computer 112, mobile phone 114, tablet computer 116. Other client devices might include laptop/notebook computers and smart classes.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 might include additional server computers, client computers, and other devices not shown. Client devices 110 might connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 might also be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Illustrative embodiments can be implemented in network data processing system 100. For example, mobile phone 114 and tablet computer 116 might include an interface for mobile learning content. Mobile learning course content can be located on a server such as server computer 104 or server computer 106 or distributed across multiple serves. Communication of course content and mobile interface inputs can be communicated over network 102 with a TCP/IP protocol.

Figure 2:
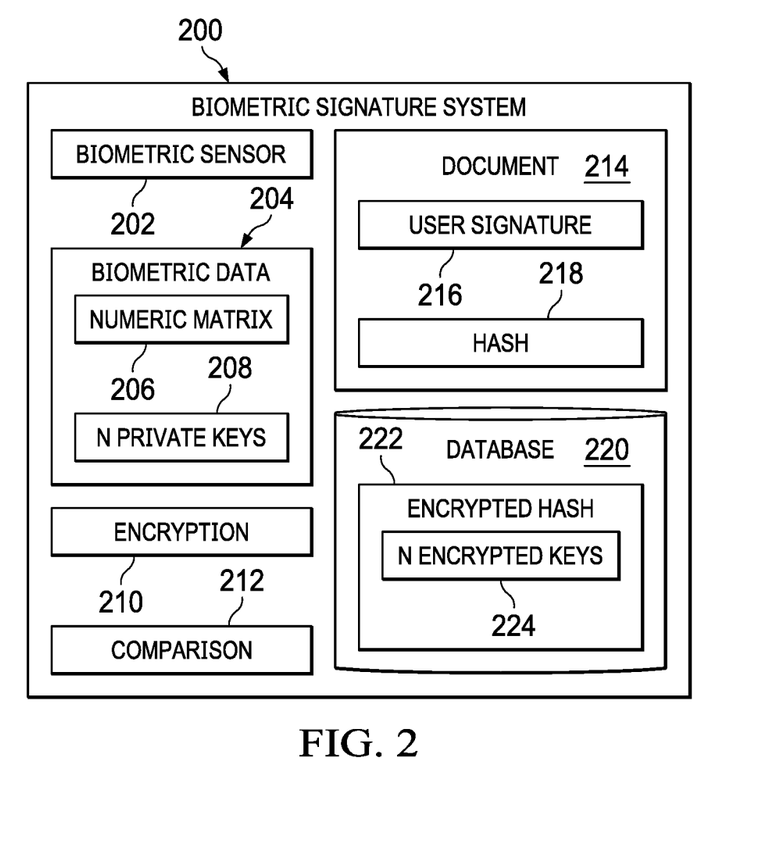
FIG. 2 depicts a block diagram of an electronic signature system in accordance with an illustrative embodiment.

Turning to FIG. 2, a block diagram of a biometric signature system is depicted in accordance with an illustrative embodiment. Biometric signature system 200 might be implemented in network data processing system 100 shown in FIG. 1.

Biometric signature system 200 comprises biometric sensor 202 that captures biometric data 204 from a user. Biometric data 204 might comprise, e.g., a fingerprint or retinal scan.

Biometric signature system 200 can create a digital artifact such as numeric matrix 206 from biometric data 204. From numeric matrix 206, biometric signature system 200 can generate N private keys 208 with which to encrypt document 214.

Document 214 might be an electronic document or a physical paper document that has been digitized. Document 214 includes a signature 216 of the user, which might be an electronic signature or a written signature on a scanned document. Biometric signature system 200 might generate a hash 218 of document 214.

Biometric signature system 200 includes encryption function 210 that can use N private keys 208 to encrypt hash 218 of document 214. Encrypted hash 222 is stored in database 220 and comprises N encryption keys 224 generated by encryption function 210.

Comparison function 212 is able to compare subsequently captured biometric data 204 against encryption keys 224 to verify that the new biometric data is in fact from the same user.

Biometric signature system 200 can be implemented in software, hardware, firmware, or a combination thereof. When software is used, the operations performed by biometric signature system 200 can be implemented in program code configured to run on hardware, such as a processor unit. When firmware is used, the operations performed by biometric signature system 200 can be implemented in program code and data and stored in persistent memory to run on a processor unit. When hardware is employed, the hardware may include circuits that operate to perform the operations in biometric signature system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

These components can be located in a computer system, which is a physical hardware system and includes one or more data processing systems. When more than one data processing system is present in the computer system, those data processing systems are in communication with each other using a communications medium. The communications medium can be a network. The data processing systems can be selected from at least one of a computer, a server computer, a tablet computer, or some other suitable data processing system.

Figure 3:
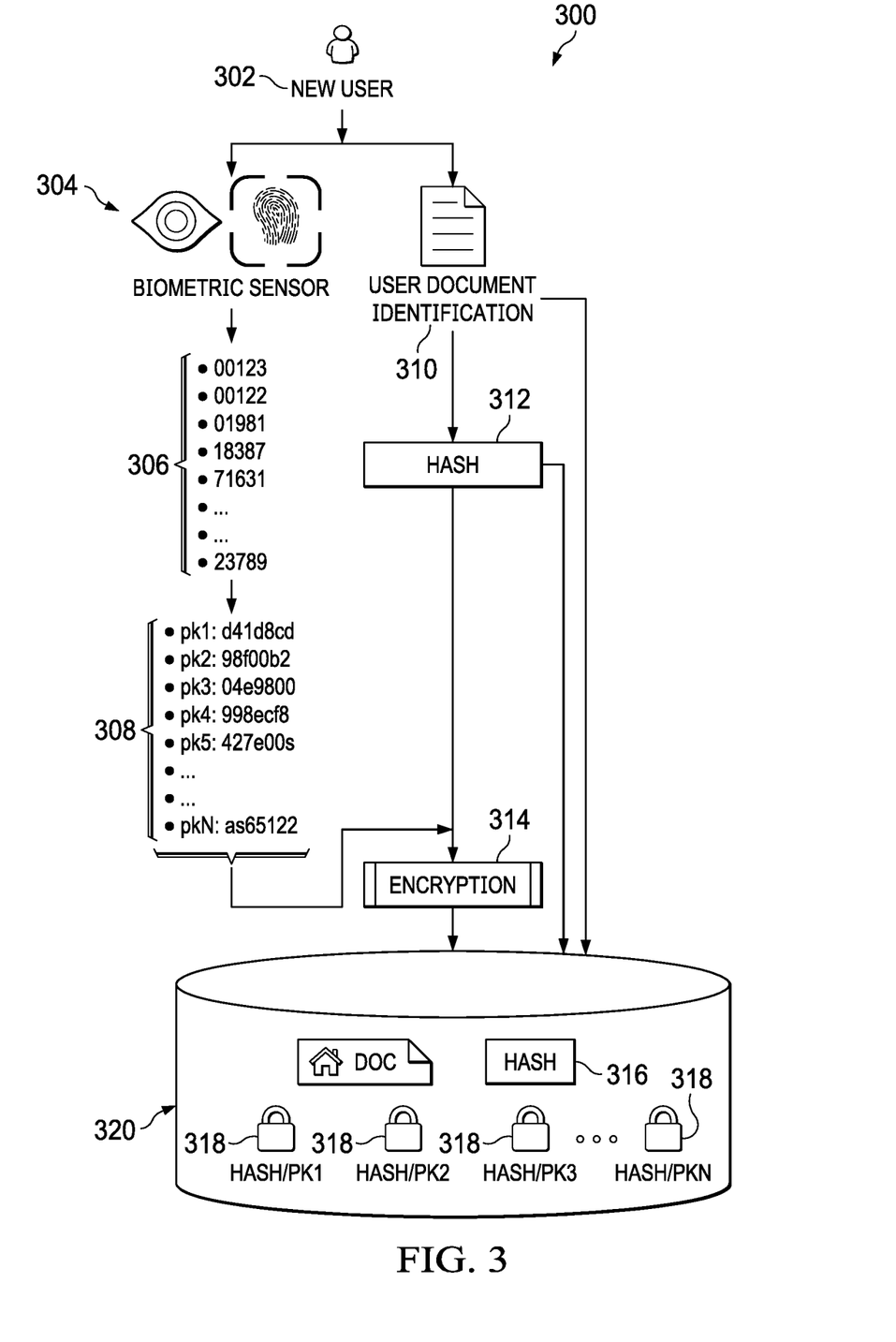
FIG. 3 depicts a schematic representation of a biometric signature enrollment system in accordance with an illustrative embodiment.

FIG. 3 depicts a schematic representation of a biometric signature enrollment system in accordance with an illustrative embodiment. Biometric enrollment system 300 might be an example of biometric signature system 200 in FIG. 2. Biometric enrollment system 300 might be used for enrollment in which the identity of a new user and corroborating biometric data are initially collected.

A new user 302 provides biometric data through biometric sensor 304. The biometric data might comprise, e.g., a fingerprint, retinal scan, facial recognition, or any reliable biometric input. Biometric enrollment system 300 generates a digital artifact 306 from the biometric data from user 302. Digital artifact 306 might be, e.g., a numeric matrix. From the digital artifact 306, biometric signature system 300 generates N private keys 308. N can be any number chosen by a developer according to the security needs of the system.

User 302 might also provide document 310, which user 302 wishes to sign. Biometric enrollment system 300 creates a hash 312 of document 310. A hash algorithm is a conversion algorithm that transforms one value to another. Hash algorithms map data of arbitrary size to an output (hash) of fixed size. When document 310 is signed, encryption 314 encrypts document 310 N times, using a different one of the N private keys 308 for each encryption, generating encrypted hash 316 with N encrypted keys 318. Encryption might be performed with the Secure Hash Algorithm (SHA) family (i.e. SHA-1, SHA-2, SHA-3).

The encrypted hash 316 and encrypted keys 318 are stored in database 320.

Figure 4:
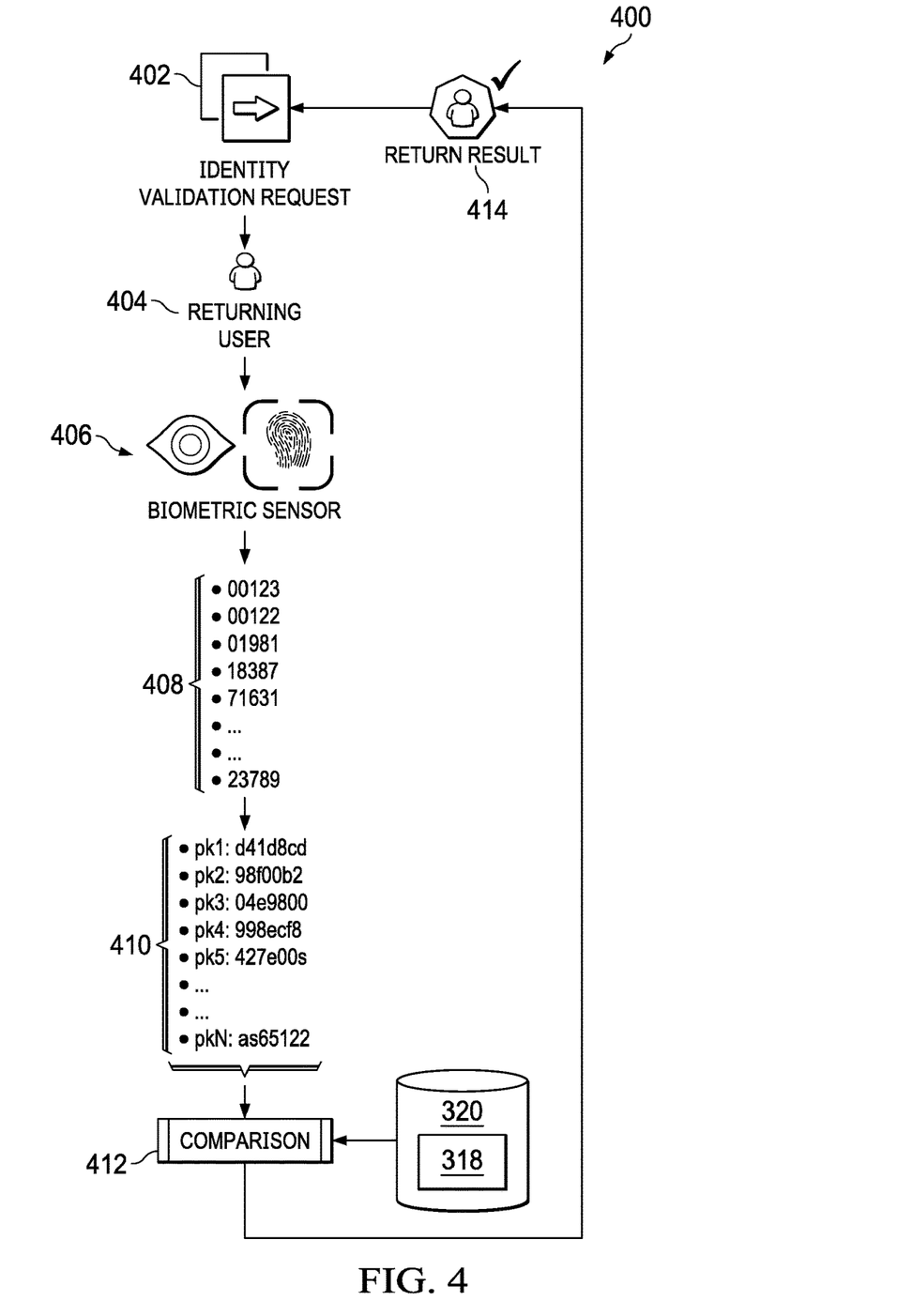
FIG. 4 depicts a schematic diagram of a biometric signature validation system in accordance with an illustrative embodiment.

FIG. 4 depicts a schematic diagram of a biometric signature validation system in accordance with an illustrative embodiment. Biometric validation system 400 might be an example of biometric signature system 200 in FIG. 2. After new user 302 has enrolled with biometric signature enrollment system 300, biometric signature validation system 400 can be used when the identity of the same user has to be verified at a later date.

Identity validation request 402 is presented to returning user 404. Biometric sensor 406 captures biometric data from the returning user 404.

Similar to biometric enrollment system 300, biometric validation system 400 generates a digital artifact 408 such as a numeric matrix from the biometric data and then generates N private keys 410 from the artifact.

Validation system 400 then makes a comparison 412 between the new N private keys 410 and the previously stored encryption keys 318 in database 320. The new N private keys 410 are used to try to decrypt the N encrypted keys 318 in database 320. The ability of new private keys 410 to decrypt encrypted keys 318 depends on the similarity of the biometric data collected during enrollment and the biometric data subsequently collected for validation. If the new N private keys 410 successfully decrypt a threshold percentage of the encrypted keys 318, the biometric validation system 400 returns a positive result 414.

Figure 5:
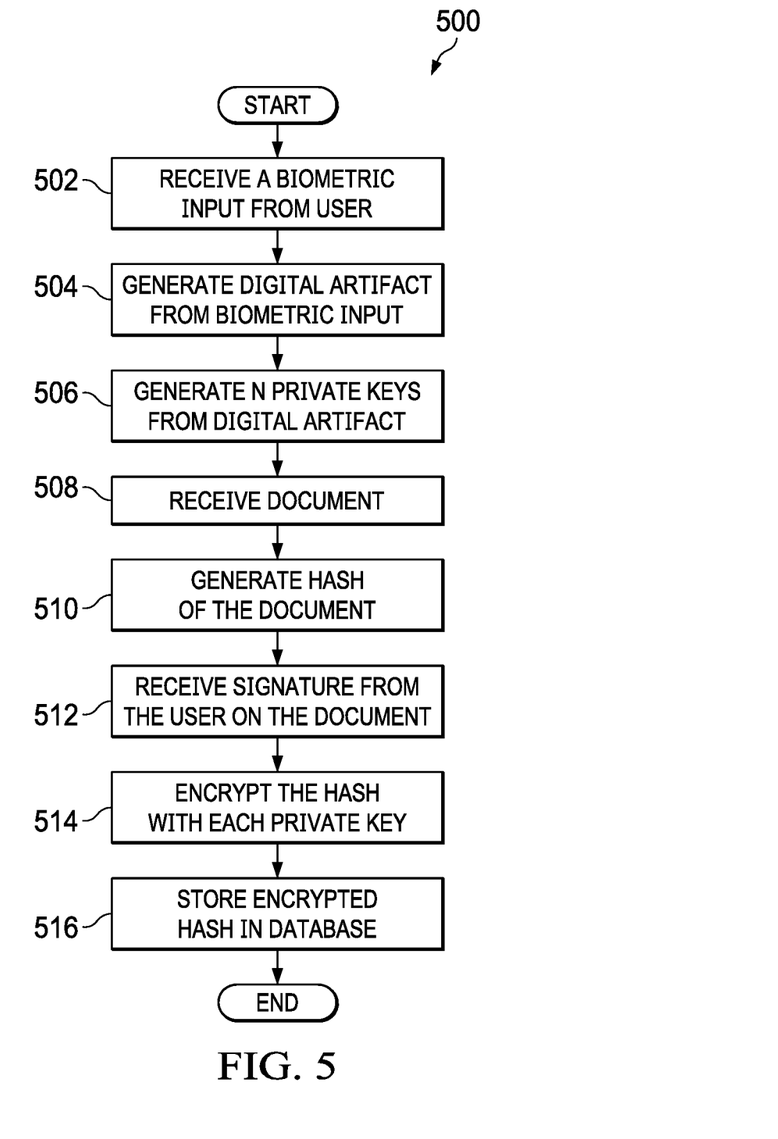
FIG. 5 depicts a flowchart illustrating a process for biometric signature enrollment in accordance with an illustrative embodiment.

FIG. 5 depicts a flowchart illustrating a process for biometric signature enrollment in accordance with an illustrative embodiment. The process in FIG. 5 can be implemented in hardware, software, or both. When implemented in software, the process can take the form of program code that is run by one of more processor units located in one or more hardware devices in one or more computer systems. Process 500 might be implemented with biometric enrollment system 300 in FIG. 3.

Process 500 begins by receiving a biometric data input from a new user (step 502). The system generates a digital artifact such as a numeric matrix from the biometric input (step 504) and then generates N private keys from the digital artifact (step 506).

The system then receives input of a document (step 508) and generates a hash of the document (step 510). The system receives a signature from the user on the document (step 512). The signature might be an electronic signature.

In response to receiving the signature, the system encrypts the hash of the document with each private key to create an encrypted hash with N encrypted keys (step 514). The system stores the encrypted hash and N encrypted keys in a database (step 516). The enrollment process then ends.

Figure 6:
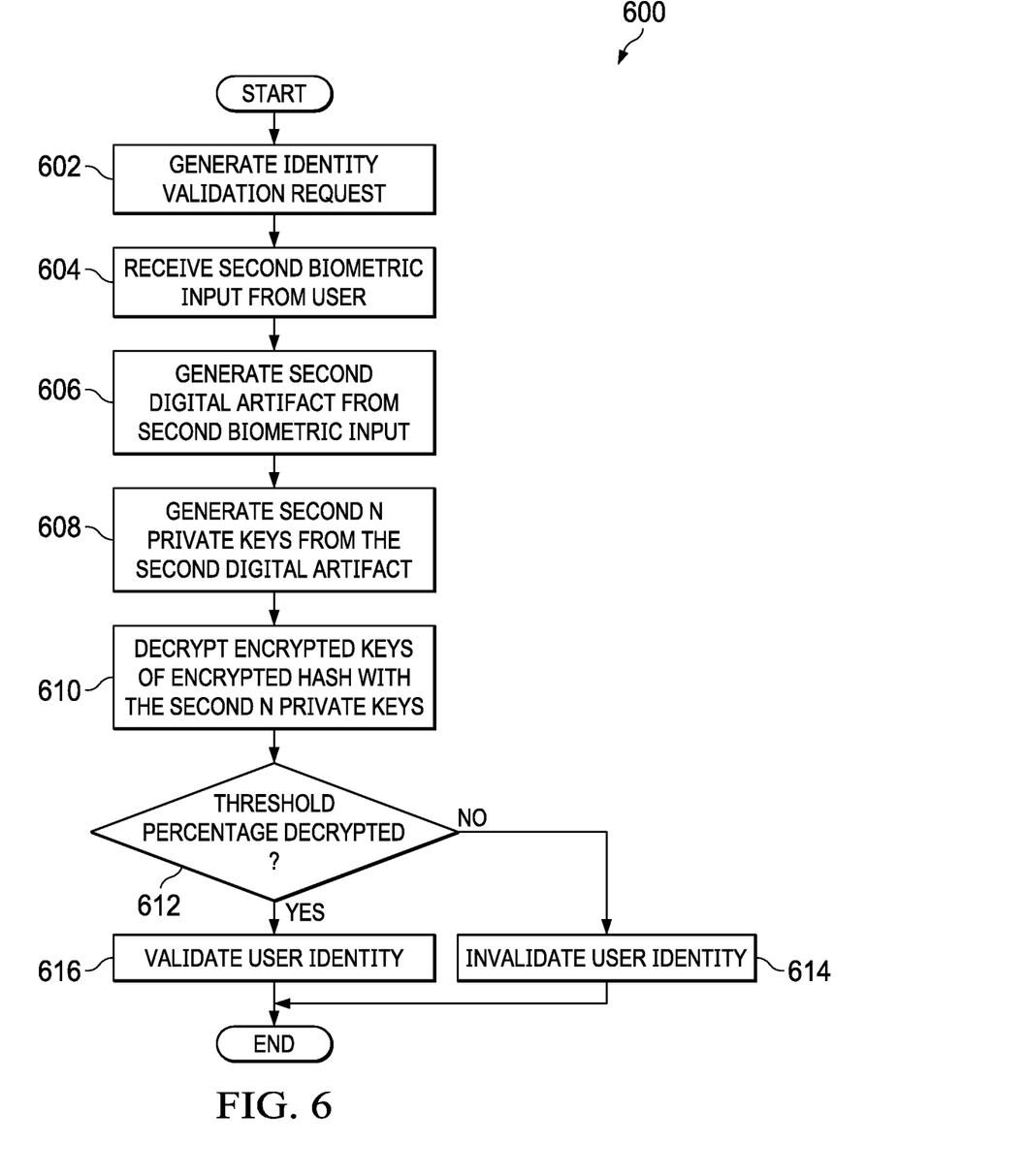
FIG. 6 depicts a flowchart illustrating a process for biometric signature validation in accordance with an illustrative embodiment.

FIG. 6 depicts a flowchart illustrating a process for biometric signature validation in accordance with an illustrative embodiment. The process in FIG. 6 can be implemented in hardware, software, or both. When implemented in software, the process can take the form of program code that is run by one of more processor units located in one or more hardware devices in one or more computer systems. Process 600 might be implemented with biometric validation system 400 in FIG. 4.

When a returning user who was previously enrolled via process 500 wishes to sign a new document, validation process 600 begins by generating an identity validation request (step 602). The system receives a second (new) biometric input from the user (step 604) and generates a new digital artifact from the new biometric input (step 606).

The system then generates a new set of N private keys from the new digital artifact (step 608). The system uses the new set of N private keys to try to decrypt the N encrypted keys of the encrypted hash stored in the database under the user's identity (step 610).

The system determines if the new N private keys can decrypt a threshold percentage of the N encrypted keys (step 612). If the second N private keys do not successfully decrypt the threshold percentage of the N encrypted keys the system invalidates the user's identity (step 614) and ends.

If the second N private keys successfully decrypt the threshold percentage of the N encrypted keys the system validates the user's identity (step 616) and ends.

Figure 7:
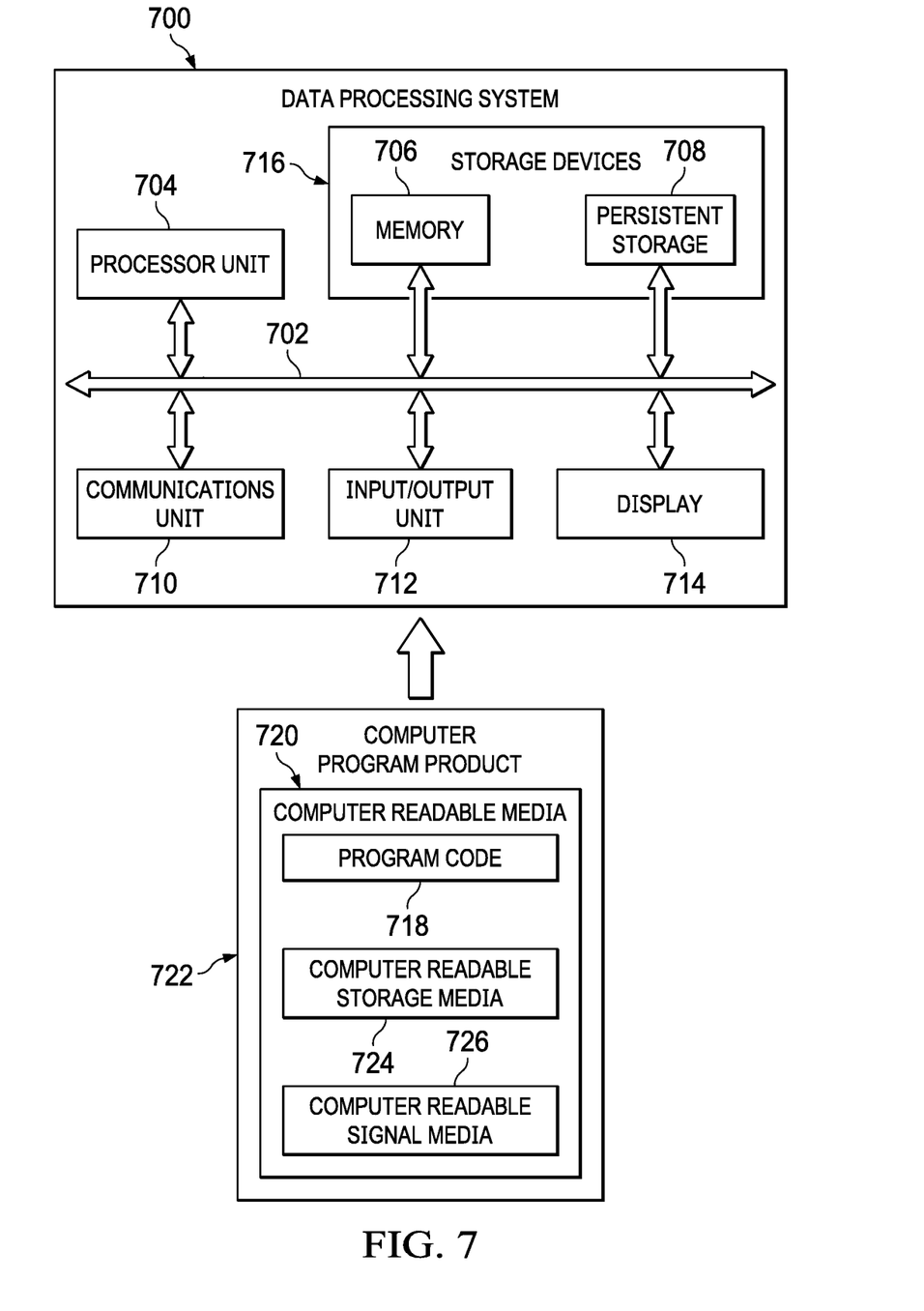
FIG. 7 is an illustration of a block diagram of a data processing system in accordance with an illustrative embodiment.

Turning now to FIG. 7, an illustration of a block diagram of a data processing system is depicted in accordance with an illustrative embodiment. Data processing system 700 may be used to implement one or more computers, including server computers 104, 106 and client devices 110 in FIG. 1. Further, data processing system 700 can also be used to implement one or more components in biometric signature system 200 in FIG. 2, biometric enrollment system 300 in FIG. 3, and biometric validation system 400 in FIG. 4. In this illustrative example, data processing system 700 includes communications framework 702, which provides communications between processor unit 704, memory 706, persistent storage 708, communications unit 710, input/output unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation. In an embodiment, processor unit 704 comprises one or more conventional general-purpose central processing units (CPUs). In an alternate embodiment, processor unit 704 comprises one or more graphical processing units (CPUs).

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 716, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708. Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer-usable program code, or computer-readable program code that may be read and executed by a processor in processor unit 704. The program code in the different embodiments may be embodied on different physical or computer-readable storage media, such as memory 706 or persistent storage 708.

Program code 718 is located in a functional form on computer-readable media 720 that is selectively removable and may be loaded onto or transferred to data processing system 700 for execution by processor unit 704. Program code 718 and computer-readable media 720 form computer program product 722 in these illustrative examples. In one example, computer-readable media 720 may be computer-readable storage media 724 or computer-readable signal media 726.

In these illustrative examples, computer-readable storage media 724 is a physical or tangible storage device used to store program code 718 rather than a medium that propagates or transmits program code 718. Alternatively, program code 718 may be transferred to data processing system 700 using computer-readable signal media 726.

Computer-readable signal media 726 may be, for example, a propagated data signal containing program code 718. For example, computer-readable signal media 726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code 718.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for biometric signature, the method comprising:
using a number of processors to perform the steps of:
receiving a biometric data input from a user;
generating a digital artifact from the biometric data input;
generating multiple private keys from the digital artifact;
receiving input of a document;
generating a hash of the document;
receiving a signature from the user on the document;
in response to receiving the signature, encrypting the hash N times withe the multiple private keys using a different one of the multiple private keys for each encryption, to create an encrypted hash with multiple encrypted keys, wherein N equals to number of private keys in the multiple private keys; and
storing the encrypted hash and the multiple encrypted keys in a database.

2. The method of claim 1, further comprising:
generating an identity validation request;
receiving a second biometric input from the user;
generating a second digital artifact from the second biometric input;
generating second multiple private keys from the second digital artifact;
decrypting the multiple encrypted keys of the encrypted hash with the second multiple private keys;
validating the user's identity if the second multiple private keys decrypt a threshold percentage of the multiple encrypted keys; and
invalidating the user's identity if the second multiple private keys do not decrypt a threshold percentage of the multiple encrypted keys.

3. The method of claim 1, wherein the biometric data input comprises a fingerprint.

4. The method of claim 1, wherein the biometric data input comprises a retinal scan.

5. The method of claim 1, wherein the digital artifact is a numeric matrix.

6. The method of claim 1, wherein the signature is an electronic signature.

7. A system for biometric signature, the system comprising:
a storage device configured to store program instructions; and
one or more processors operably connected to the storage device and configured to execute the program instructions to cause the system to:
receive a biometric data input from a user;
generate a digital artifact from the biometric data input;
generate multiple private keys from the digital artifact;
receive input of a document;
generate a hash of the document;
receive a signature from the user on the document;
in response to receiving the signature, encrypt the hash N times with the multiple private keys using a different one of the multiple private keys for each encryption, to create an encrypted hash with multiple encrypted keys, wherein N equals to number of private keys in the multiple private keys; and
store the encrypted hash and the multiple encrypted keys in a database.

8. The system of claim 7, wherein the processors further execute instructions to:
generating an identity validation request;
receiving a second biometric input from the user;
generating a second digital artifact from the second biometric input;
generating second multiple private keys from the second digital artifact;
decrypting the multiple encrypted keys of the encrypted hash with the second multiple private keys;
validating the user's identity if the second multiple private keys decrypt a threshold percentage of the multiple encrypted keys; and
invalidating the user's identity if the second multiple private keys do not decrypt a threshold percentage of the multiple encrypted keys.

9. The system of claim 7, wherein the biometric data input comprises a fingerprint.

10. The system of claim 7, wherein the biometric data input comprises a retinal scan.

11. The system of claim 7, wherein the digital artifact is a numeric matrix.

12. The system of claim 10, wherein the signature is an electronic signature.

13. A computer program product for biometric signature, the computer program product comprising:
a computer readable storage media having program instructions stored thereon to perform the steps of:
receiving a biometric data input from a user;
generating a digital artifact from the biometric data input;
generating multiple private keys from the digital artifact;
receiving input of a document;
generating a hash of the document;
receiving a signature from the user on the document;
in response to receiving the signature, encrypting the hash N times with the multiple private keys using a different one of the multiple private keys for each encryption, to create an encrypted hash with multiple encrypted keys, wherein N equals to number of private keys in the multiple private keys; and
storing the encrypted hash and multiple encrypted keys in a database.

14. The computer program product of claim 13, further comprising instructions for:
generating an identity validation request;
receiving a second biometric input from the user;
generating a second digital artifact from the second biometric input;
generating second multiple private keys from the second digital artifact;
decrypting the multiple encrypted keys of the encrypted hash with the second multiple private keys;
validating the user's identity if the second multiple private keys decrypt a threshold percentage of the multiple encrypted keys; and
invalidating the user's identity if the second multiple private keys do not decrypt a threshold percentage of the multiple encrypted keys.

15. The computer program product of claim 13, wherein the biometric data input comprises a fingerprint.

16. The computer program product of claim 13, wherein the biometric data input comprises a retinal scan.

17. The computer program product of claim 13, wherein the digital artifact is a numeric matrix.

18. The computer program product of claim 13, wherein the signature is an electronic signature.

* * * * *